US006981639B1

(12) United States Patent
Pires

(10) Patent No.: US 6,981,639 B1
(45) Date of Patent: Jan. 3, 2006

(54) OBJECT STORING SYSTEM WITH ILLUMINATED HOUSINGS

(75) Inventor: Manuel F. Pires, Oxford, CT (US)

(73) Assignee: Morse Watchmans, Inc., Oxford, CT (US)

( * ) Notice: Subject to any disclaimer, the term of this patent is extended or adjusted under 35 U.S.C. 154(b) by 89 days.

(21) Appl. No.: 10/426,735

(22) Filed: Apr. 30, 2003

(51) Int. Cl.
G06K 5/00 (2006.01)

(52) U.S. Cl. ............................ 235/382; 362/559; 221/2

(58) Field of Classification Search ................ 362/559, 362/23; 235/492; 221/2
See application file for complete search history.

(56) References Cited

U.S. PATENT DOCUMENTS

| 1,340,145 | A | 5/1920 | Blair et al. |
| 1,403,048 | A | 1/1922 | Mecorney |
| 1,947,377 | A | 2/1934 | Blanchard |
| 2,476,257 | A | 7/1949 | Hoff |
| 2,554,223 | A | 5/1951 | Szabo |
| 3,070,235 | A | 12/1962 | Manzardo |
| 3,213,269 | A | 10/1965 | Melvin et al. |
| 3,638,603 | A | 2/1972 | Conover |
| 3,645,227 | A | 2/1972 | Lahmer |
| 3,737,898 | A | 6/1973 | Cross, Jr. |
| 3,755,661 | A | 8/1973 | Bouvrande |
| 3,762,601 | A | 10/1973 | McLaughlin |
| 3,780,695 | A | 12/1973 | Richard |
| 4,104,981 | A | 8/1978 | Ono et al. |
| 4,163,332 | A | 8/1979 | Salam |
| 4,592,600 | A | 6/1986 | Bohnet et al. |
| 4,640,560 | A | 2/1987 | Blum |
| 4,673,915 | A | 6/1987 | Cobb |
| 4,717,213 | A | 1/1988 | Bohnet et al. |
| 4,772,769 | A | 9/1988 | Shumate |
| 4,828,341 | A | 5/1989 | Bohnet et al. |
| 4,975,807 | A | 12/1990 | Ohashi |
| 5,184,116 | A | 2/1993 | Daugherty et al. |
| 5,311,757 | A * | 5/1994 | Spahn ........................ 70/408 |
| 5,408,443 | A | 4/1995 | Weinberger |
| 5,791,512 | A | 8/1998 | Kanatsuka |
| 5,954,225 | A | 9/1999 | Powe |
| 6,039,467 | A | 3/2000 | Holmes |
| 6,138,865 | A | 10/2000 | Gilmore |
| 6,195,005 | B1 * | 2/2001 | Maloney .................. 340/568.1 |
| 6,217,183 | B1 | 4/2001 | Shipman |
| 6,592,028 | B2 | 7/2003 | Pires et al. |
| 6,609,657 | B2 | 8/2003 | Pires |
| 2002/0074339 | A1 | 6/2002 | Gilmore |
| 2003/0156427 | A1 * | 8/2003 | Robey ........................ 362/559 |
| 2003/0156428 | A1 * | 8/2003 | Robey ........................ 362/559 |

* cited by examiner

Primary Examiner—Daniel Stcyr
Assistant Examiner—Daniel A. Hess
(74) Attorney, Agent, or Firm—Carmody & Torrance LLP

(57) ABSTRACT

A storage system for storing a plurality of objects, wherein one or more objects are each associated with a smartkey, the system comprising a system housing defining a recess; a front panel with at least one opening therein; a support board positioned within the recess and behind the front panel; a plurality of smartkey housings, each of which are coupled to at least one of the front panel and the support board, and operable to receive a smartkey therein; a plurality of concentrated lightsources each of which are associated with a respective smartkey housing and coupled to the support board, the concentrated lightsources being positioned behind at least a portion of each of the respective smartkey housings; circuitry for processing information and causing the illumination of specific concentrated lightsources; wherein at least a portion of each smartkey housing is illuminatable when the concentrated lightsource associated with a smartkey housing is illuminated.

17 Claims, 8 Drawing Sheets

OBJECT STORING SYSTEM WITH ILLUMINATED HOUSINGS

BACKGROUND OF THE INVENTION

The present invention relates generally to systems for storing objects, and in particular, to an improved system that utilizes illuminatable smartkey housings to provide improved location visibility of the smartkey authorized to be removed therefrom.

The state of the art in object storage systems generally of the type to which the present invention relates can be most easily understood from a reading of U.S. Pat. Nos. 6,131,808, 6,431,438, and 6,609,657 (hereinafter collectively referred to as the "Assignee's Patents"), which are all commonly owned by the present Assignee, an exemplary embodiment being illustrated in FIG. 1 herein.

Specifically, in the prior art embodiment generically illustrated in FIG. 1, a system, generally indicated at 1, may have one or more smartkeys, generally indicated at 2, receivable in one or more smartkey housings 3. Each smartkey housing 3 has associated with it a respective LED 4, which is illustrated as being directly above each respective housing 3. Constructed in this manner, a user may be provided with access to one or more of the smartkeys 2, and the indication as to which smartkey the user shall be provided access to is provided by illuminating the LED 4 associated with the smartkey to which the user has been authorized to remove, the circuitry, hardware, software and associated methodology all of which is described in great detail in the Assignee's Patents.

However, the use of such LEDs in the aforementioned system 1 has been found, in some instances, to be less than desirable. For example, and as also illustrated in FIG. 1, there may occur the situation where the objects, such as large keys for example, may hang sufficiently below their own respective housing 3 thereby covering the LED 4 associated with a housing 3 located in the column directly below. For example, housings 3 which are respectively located at positions 1,G and 1,H have smartkeys with large objects 5A, 5B respectively. These objects 5A, 5B can be seen to overlie and at least partially visibly block LED 4 associated with housing 3 at the 2,H position. In the event that LED 4 associated with housing 3 at the 2,H position was illuminated, thus indicating to a user that access to the smartkey 2 disposed therein was granted, the user might not be able to clearly see it. This problem may be exacerbated if the system, or portions thereof, are "crowded" with many smartkeys 2 and/or many large objects. As such, it would be desirable to provide for a better smartkey indicator construction.

U.S. Pat. No. 4,673,915 appears to illustrate and describe the illumination of a translucent lens of a peg on which the object is positioned, while U.S. Pat. No. 6,039,467 describes illuminating portions of bins to assist in the location of an item by shining light from an LED into a wall of the bin. However, both of these embodiments are quite different from that which is proposed herein, for reasons of construction and functionality.

Accordingly, it is desired to provide an improved system for storing objects of the type generally described in the Assignee's Patents, but which is an improvement thereof for the reasons noted above and below, and which overcomes the aforementioned deficiencies and achieves the objectives and advantages set forth below.

OBJECTS AND SUMMARY OF THE INVENTION

Therefore, it is an object of the present invention to provide an improved system for storing objects.

It is another object of the present invention to improve the systems described in U.S. Pat. Nos. 6,131,808 and 6,431,438 and pending application Ser. No. 09/915,938, by facilitating the visibility of the smartkey housing in which the smartkey that has been authorized to be removed is located.

Yet another object of the present invention is to facilitate the manufacturability and construction of such an improved system.

Yet another object of the present invention is to be able to provide an increased concentration of smartkey housings in a given system housing since the needed space by the prior art LEDs has been eliminated.

Still other objects and advantages of the invention will in part be obvious and will in part be apparent from the specification.

The invention accordingly comprises the features of construction, combination of elements and arrangement of parts that will be exemplified in the disclosure hereinafter set forth, and the scope of the invention will be indicated in the claims.

Generally speaking, the present invention is directed to an improved storage system for storing at least one object, wherein the object is associated with a smartkey, the system comprising a system housing; a front panel with at least one opening therein; a support board coupled to the system housing and behind the front panel; at least one smartkey housing, coupled to at least one of the front panel and the support board, and operable to receive the smartkey therein; a concentrated lightsource which is associated with the smartkey housing and coupled to the support board, the concentrated lightsource being positioned behind at least a portion of the smartkey housing; circuitry for processing information and causing the illumination of the concentrated lightsource; wherein at least a portion of the smartkey housing is illuminatable when the concentrated lightsource associated with the smartkey housing is illuminated.

Particular features of the present invention include a front surface of the smartkey housing that extends outwardly from the front panel, and wherein at least the front surface of the smartkey housing is illuminated when the concentrated lightsource associated with and disposed behind the smartkey housing is illuminated. Preferably, at least a portion of the smartkey housing is comprised of a translucent material.

The smartkey housing preferably may even comprise a lightguide integrally formed with and extending outwardly from the back of the smartkey housing, the lightguide having a distal end in which a concavity is formed. In this way, the concentrated lightsource is aligned with the concavity of the lightguide to channel light from the concentrated lightsource into the lightguide and through the smartkey housing. Preferably, the concentrated lightsource is an LED.

Other features of the present invention are that the smartkey housing is coupled to the front panel by a snap-fitting arrangement and that the smartkey housing includes a guidepost, and wherein the support board receives the guidepost of the smartkey housing, whereby the smartkey housing is prohibited from being incorrectly mounted against the support board due to the fact that the smartkey housing cannot be snap-fitted to the front panel if the guidepost is not received by the support board.

The present storage system is also configured, as will be quite clear from a reading of the present application, for storing a plurality of objects, wherein one or more objects are each associated with a smartkey, and wherein the system comprises a plurality of smartkey housings, each of which are coupled to at least one of the front panel and the support board, and operable to receive a smartkey therein; and a plurality of concentrated lightsources each of which are associated with a respective smartkey housing and coupled to the support board, with at least one concentrated lightsource being positioned behind at least a portion of each of the respective smartkey housings.

BRIEF DESCRIPTION OF THE DRAWINGS

For a fuller understanding of the invention, reference is made to the following description taken in connection with the accompanying drawings, in which.

Identically labeled elements appearing in different ones of the above-described figures refer to the same elements but may not be referenced in the description for all figures.

DETAILED DESCRIPTION OF THE PREFERRED EMBODIMENTS

Figure 1:
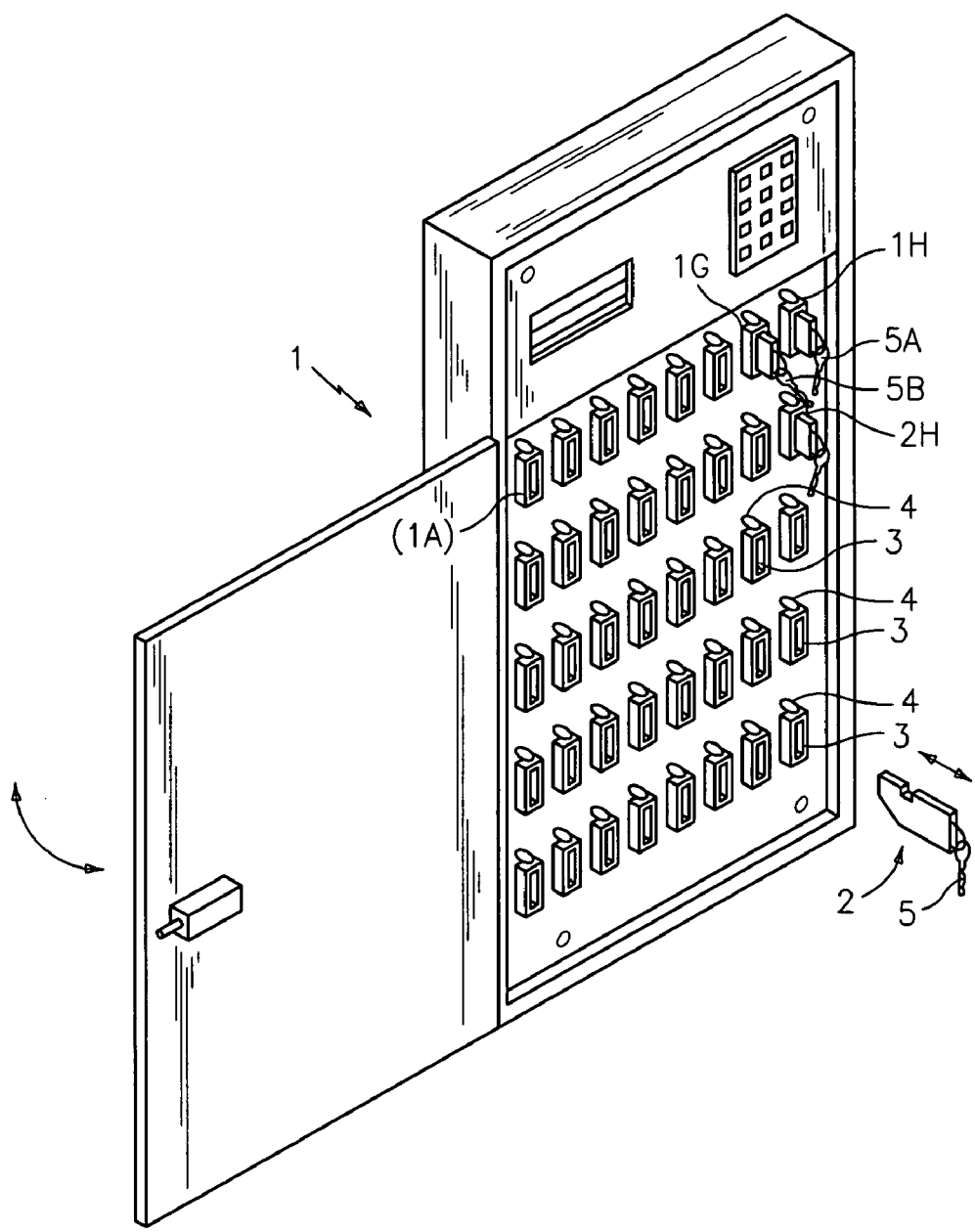
FIG. 1 is a perspective view of a storage system constructed in accordance with the prior art.

Generally speaking, the present invention is an improvement over the systems described in the Assignee's Patents, which are all commonly owned by the present assignee. Of course, with the exception of the details of the present invention, the Assignee's Patents provides a complete disclosure of the electronics, software and hardware features, construction and operations of the present invention. Accordingly, the subject matter of U.S. Pat. Nos. 6,131,808 and 6,431,438 and pending application Ser. No. 09/915,938, now U.S. Pat. No. 6,609,657, along with the minor changes to the Figures made in application Ser. No. 09/915,938, are incorporated by reference as if fully set forth herein.

As set forth above, the present invention is directed to a storage system for storing at least one object, wherein the object is associated with a smartkey, the system comprising a system housing defining a recess; a front panel with at least one opening therein; a support board coupled to the system housing and preferably, but not necessarily, positioned within the recess, and behind the front panel; at least one smartkey housing, coupled to at least one of the front panel and the support board, and operable to receive the smartkey therein; a concentrated lightsource which is associated with the smartkey housing and coupled to the support board, the concentrated lightsource being positioned behind at least a portion of the smartkey housing; circuitry for processing information and causing the illumination of the concentrated lightsource; wherein at least a portion of the smartkey housing is illuminatable when the concentrated lightsource associated with the smartkey housing is illuminated.

In a particular embodiment, the storage system stores a plurality of objects, wherein one or more objects are each associated with a smartkey. As such, the system comprises a plurality of smartkey housings, each of which are coupled to at least one of the front panel and the support board, and operable to receive a smartkey therein; a plurality of concentrated lightsources each of which are associated with a respective smartkey housing and coupled to the support board, with at least one of the plurality of concentrated lightsources being positioned behind at least a portion of each of the respective smartkey housings; circuitry for processing information and causing the illumination of specific concentrated lightsources; wherein at least a portion of each smartkey housing is illuminatable when the concentrated lightsource associated with a smartkey housing is illuminated. Details of the system shall now be described with reference first being made to FIGS. 2–3.

The system for storing objects in accordance with the present invention is generally indicated at 10. By the term "storing," it is intended that any of the uses to which the Assignee's Patents describe or suggest, shall fall within the meaning of "storing." Hence, either the use of the smartkey itself, or any embodiments in which an associated recess, chamber and/or entrapping arm is utilized shall be deemed to fall within a system for storing objects as disclosed and claimed herein.

Generally speaking, system 10 includes a plurality of smartkey housings, generally indicated at 30. The preferred smartkey for use in the present invention is generally indicated at 50, and preferably constructed in accordance with the teachings of the Assignee's Patents, although such construction should be understood to be exemplary since other constructions of a smartkey that are functionally compatible with the present invention are contemplated hereby. Moreover, while in the present invention smartkey 50 is received and insertable within an opening 31 within any one of the smartkey housings 30, all as set forth in the Assignee's Patents, not illustrated in the present invention is the ability to releasably lock the smartkey in a respective smartkey housing 30. As such, the construction of the smartkey to engage a locking means and the locking means itself, such as a solenoid, all of which is described in the Assignee's Patents, is not explicitly provided in the present invention, although the Figures disclose relay circuitry to be used in connection therewith for the convenience of the reader, although in another preferred embodiment, FETs can be used in place of such relays.

Without individualized locking devices, a front door panel 11 with a lock 12 may be hingedly coupled to the system's housing, generally indicated at 13, in a known manner, so as to provide increasing security and protection of the objects stored and/or entrapped within system 10. A display 14 and a keypad 15 may also be provided as set forth in the Assignee's Patents, thereby providing a vehicle by which a user may input information to and/or be provided information regarding (and/or access in the first instance) to specific smartkeys.

Figure 2:
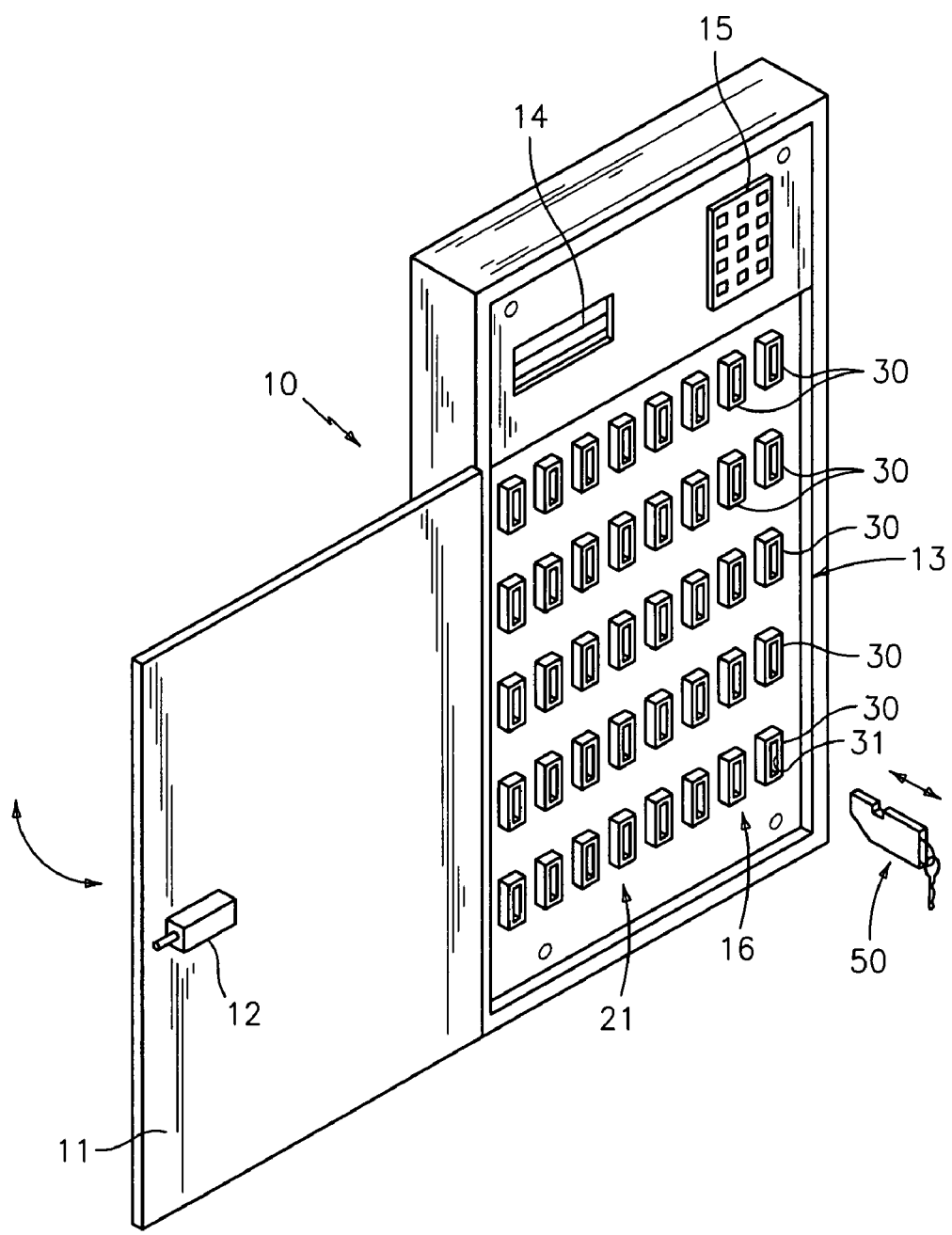
FIG. 2 is a perspective view of a storage system constructed in accordance with the present invention.
Figure 3:
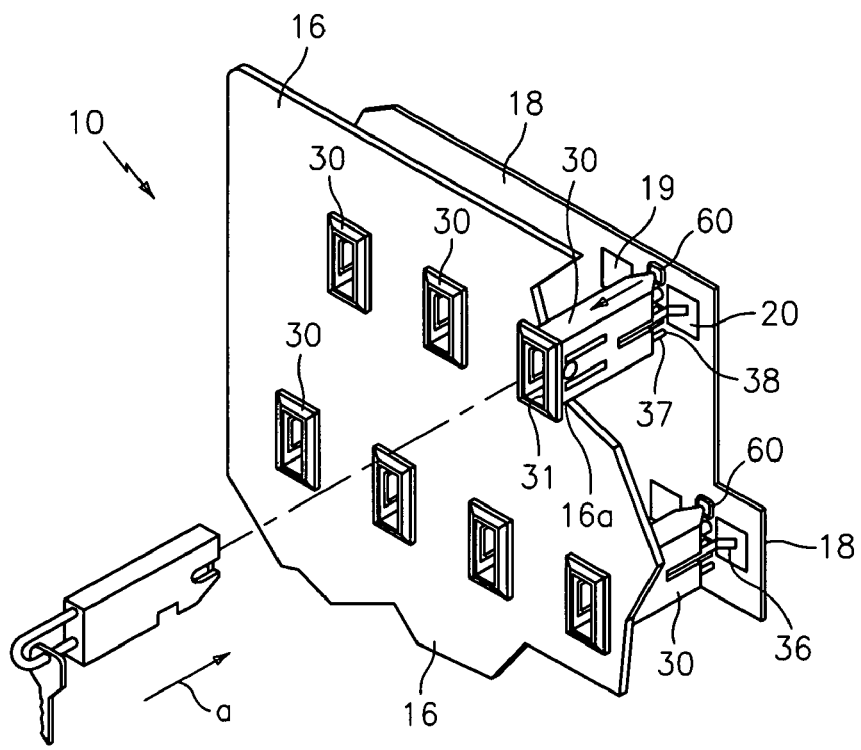
FIG. 3 is a perspective cut-away view of a portion of the storage system of FIG. 2, highlighting the features and construction of the present invention.

FIG. 2 also illustrates that each of the smartkey housings 30, the number of which is a matter of design choice and system constraints, are disposed within system housing 13, and more specifically, within a recess generally indicated at 21. Preferably, system 10 also includes a front panel 16 with openings 16a, coupled to system housing 13, through which a front end of each smartkey housing 30 extends and may be secured, as disclosed below.

Figure 4:
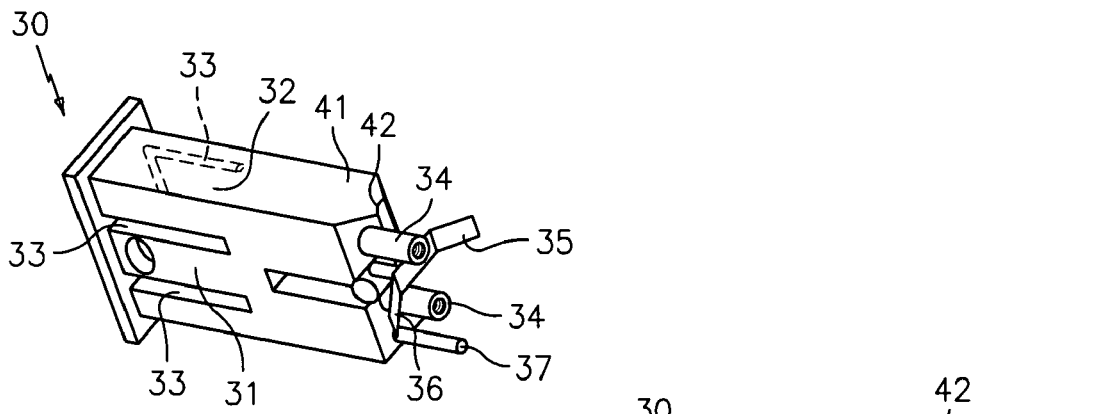
FIG. 4 is a rear perspective view of a smartkey housing constructed in accordance with the present invention.
Figure 5:
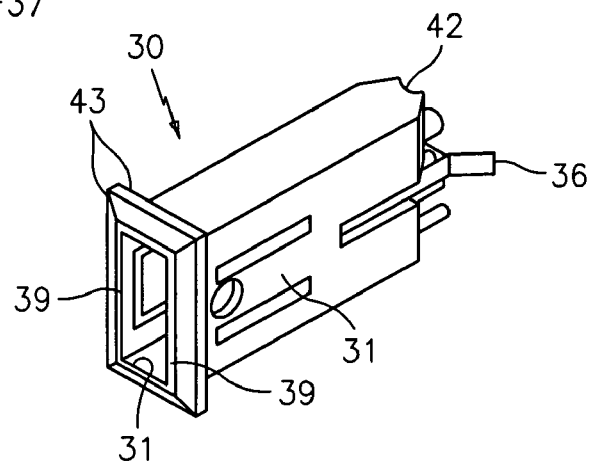
FIG. 5 is a front perspective view of the smartkey housing of FIG. 4.

Reference is thus briefly made to FIGS. 4 and 5 for a description of a particular feature of preferred construction of an exemplary smartkey 50. Specifically, smartkey housing 30 is preferably made from plastic, such as ABS plastic, commonly available from Dupont, with other features of the plastic being discussed in greater detail below.

Each side of housing 30 preferably comprises a wing 31, 32, formed in each respective side surface thereof. Small flanges 33 extend from each respective top and bottom edge of each wing 31 and 32, so that when housing 30 is inserted into front panel 16 (see arrow "a" in FIG. 3), flanges 33 engage the inner surface of front panel 16 to help secure the housing thereagainst in a snap-fitting arrangement.

Returning to FIGS. 2 and 3, a support board 18 is positioned within recess 21, spaced apart from and behind front panel 16. In the preferred embodiment, each smartkey housing 30 may be secured to support board 18 by one or more screws or other securing means, such as rivets or another snap-fitting arrangements. Such securing of the housing 30 to the support board further secures housing 30 in system 10, and further reduces the likelihood that the housing will be repeatedly or undesirably removed, thus reducing the likelihood of dirt or other contaminants interfering with the electrical contact between the connectors and conductive pads on the support board 18, which will be discussed in greater detail below. Thus in the preferred embodiment, each housing 30 may have one or more mounts 34 (see FIG. 4) with threaded openings to receive a screw (not shown). The screw(s) are thus first inserted through correspondingly aligned hole(s) (not shown) in support board 18 and thereafter inserted and secured in mounts 34. In this way, housing 30 may be secured to at least one of the front plate 16 and support board 18, and preferably, but not necessarily, both.

Support board 18 is preferably a PCB and thus has a plurality of electrical conducting paths therein and/or thereon. In accordance with the present invention, every smartkey housing provided for in the system may have its own set of conductive pads for a lightsource to illuminate the housing. Specifically, such conductive pads as will be readily appreciated, eliminate the need for the hard wires most clearly illustrated in FIGS. 3 and 5 in the Assignee's Patents. As would be clearly understood by one skilled in the art, these conductive pads (not shown) for the lightsource are respectively and electrically coupled to point 2 of the resistor and point 2 of diode D16, both of which are illustrated in FIG. 6.

Figure 6:
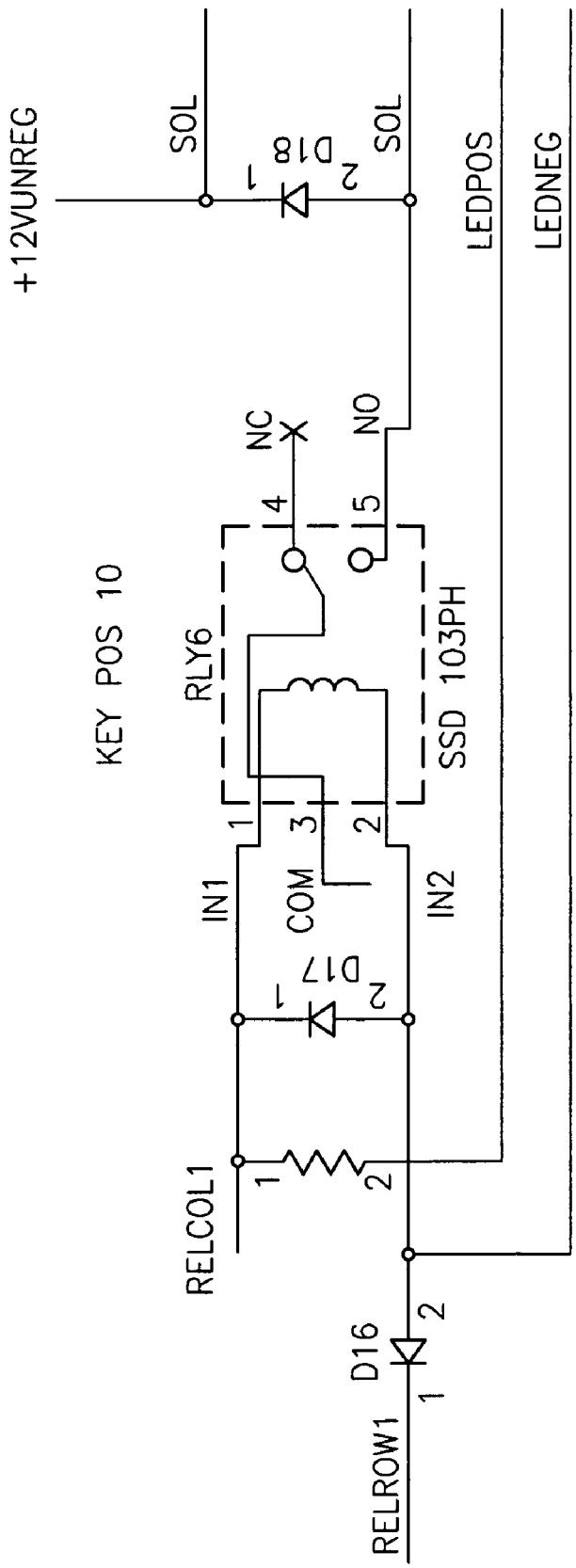
FIGS. 6–10 respectively correspond to FIGS. 35, 30, 20A, 32 and 25 in each of the Assignee's Patents, and are referenced herein for purposes of particularly disclosing the circuitry and methodology for illuminating a concentrated lightsource, and a more detailed description of the circuitry can be found in the Assignee's Patents.

Specifically, the lightsource is illuminated when, as illustrated in FIG. 6, its anode, through one of the conductive pads, is electrically connected to a high signal on RELCOL1 and its anode is electrically coupled to a low signal on RELROW1. For completeness, it is noted that the elimination of the solenoids in the present invention eliminates the need for the plurality of relays, one of which being illustrated in FIG. 6.

Each smartkey housing 30 has associated therewith its own concentrated lightsource, which is preferably an LED, indicated by reference numeral 60, which is preferably surface mounted on support board 18 and coupled to the pads as set forth above. Such surface mounted LEDs are widely available, the preferred ones being the 3.2× 1.6 mm SMD CHIP LED LAMPS manufactured by Kingbright.

Like the smartkey housing in the Assignee's Patents, the present smartkey housings 30 include first and second connectors 35 and 36, each for electrically coupling to a respective side of the memory chip, preferably a Dallas 1990 or 1990A, manufactured by Dallas Semiconductor, although other functionally equivalent chips are applicable. The understanding of the Dallas or equivalent memory chip, as well as its use, function and programming and incorporation into the present invention, is well known to those skilled in the art, especially when taken in combination with the teachings of the Assignee's Patents.

The remaining connections thus needed to form the electrical circuit to enable the present invention in a manner similar to that illustrated and described in the Assignee's Patents is to electrically couple first connector 35 to a conductive pad 19 and second connector 36 to a conductive pad 20, also provided for on support board 18. Preferably this is done by spring-biasing each connector against its respective pad with sufficient force to ensure consistent and non-intermittent contact therebetween. Again, the snap-fitting arrangement of housing 30 to front panel 16 and/or the use of coupling housing 30 to support board 18, such as with the use of screws, ensures the sufficient biasing force. Moreover, one skilled in the art would understand how to dimension the housing, length of the connectors and spacing between the front panel and support board to achieve a satisfactory coupling. A satisfactory biasing force between the connectors and the conductive pads is clearly within the purview of the skilled artisan.

Each smartkey housing 30 also preferably includes a guidepost 37, and support board 18 thus comprises a complementary guidehole 38, or other indentation, for receiving guidepost 37. In this way, the smartkey housing, since it is typically symmetrical about its outside shape, is prohibited from being incorrectly mounted against the support board due to the fact that the smartkey housing cannot be snap-fitted to the front panel if the guidepost is not received in the guidehole.

Reference is again made to FIGS. 4 and 5 for additional features of the present invention. Specifically, in accordance with the present invention and as indicated above, smartkey housing 30 is preferably made of plastic. In the preferred embodiment, smartkey housing is preferably made of clear plastic and is therefore translucent, the reasons therefore being discussed momentarily. Alternatively, and in keeping with the purpose of the present invention, the entire smartkey housing need not be comprised of clear plastic, as long as the front surface, indicated generally by reference numeral 39, is translucent, such that light emanating from its associated LED 60 passes therethrough and is visible by a user standing near and/or in front of system 10. Specifically, front surface 39 of the smartkey housing extends outwardly from the front panel, and wherein at least the front surface of the smartkey housing is illuminated when the concentrated lightsource associated with and disposed behind the smartkey housing is illuminated.

Additionally, the smartkey housing preferably comprises a lightguide integrally formed with and extending outwardly from the back of the smartkey housing, the lightguide having a distal end in which a concavity is formed. In this way, the concentrated lightsource can be at least essentially, if not fully, aligned with the concavity of the lightguide to channel light from the concentrated lightsource into the lightguide and through the smartkey housing.

Specifically, at the distal top end 41 of housing 30, housing 30 includes an edge 42 that has a region that is concave. The use of a concave edge of housing 30 facilitates the optical coupling between housing 30 and LED 60, as well as facilitates the shaping of the light into housing 30 and the channeling of the light therethrough. The amount of the concavity of the surface of end 41 is at least in part dictated by the lightsource used, and it is desirable to get the lightsource and the end 41 as close together as possible, with the alignment of the lightsource and concavity as close as possible.

Again, the entire housing 30 need not be translucent or otherwise clear, and geometries may be molded on the surface of housing 30 to facilitate and optimize the distribution of light through housing 30 and emanating from LED 60. The molding of the preferred geometries may be achieved by conventional molding techniques. In fact, the use of such geometries may assist in preventing needed light from escaping from the sides of housing 30, such as that portion of the housing positioned behind front panel 16 and therefore out of sight by the user. In fact, it will also be appreciated that the edges or side surfaces behind the front panel may be "roughed-up" by conventional paint scattering techniques or "pitting," thus further hindering the likelihood that light will exit the edges or sides, thereby permitting more light to desirably exit front surface 39.

A flange 43 is also provided around the periphery of front surface 39 to assist in engaging front panel 16. This flange may also be clear and/or translucent to provide for the increased visibility sought and provided by the present invention.

Figure 7:
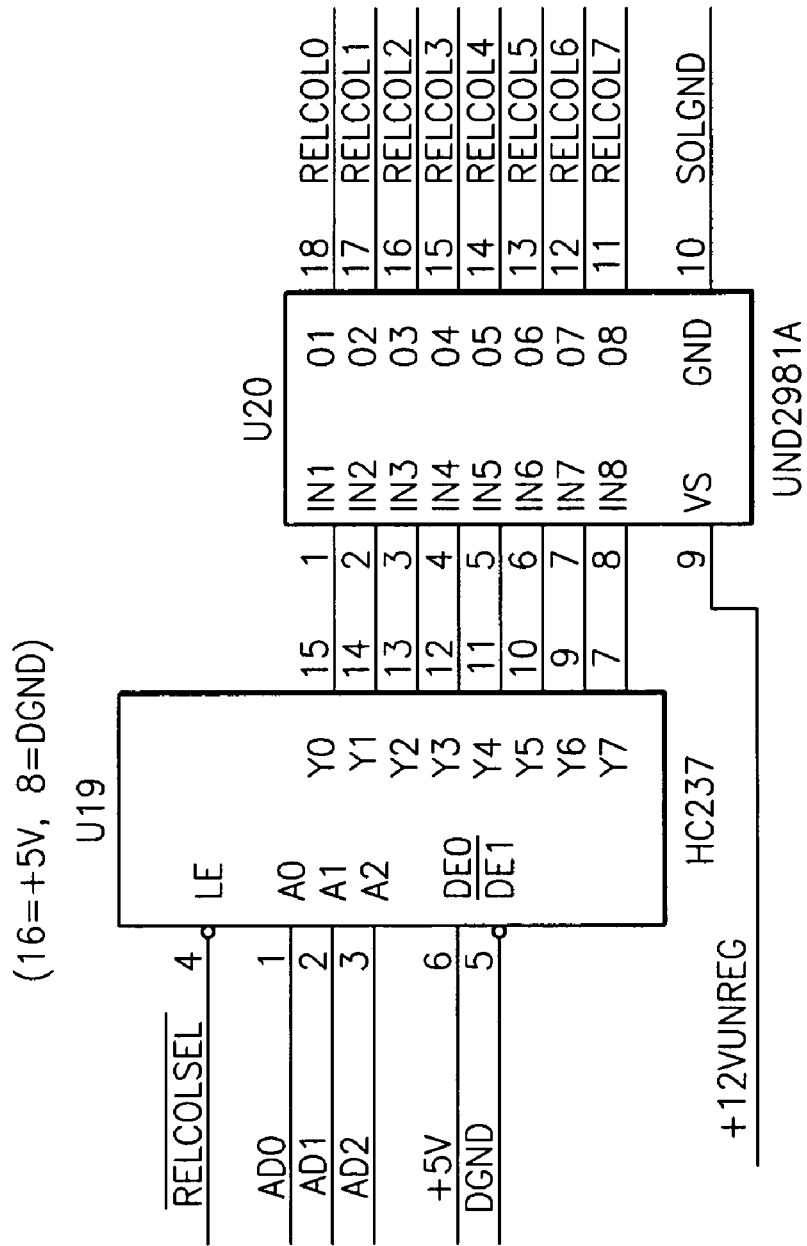
Figure 8:
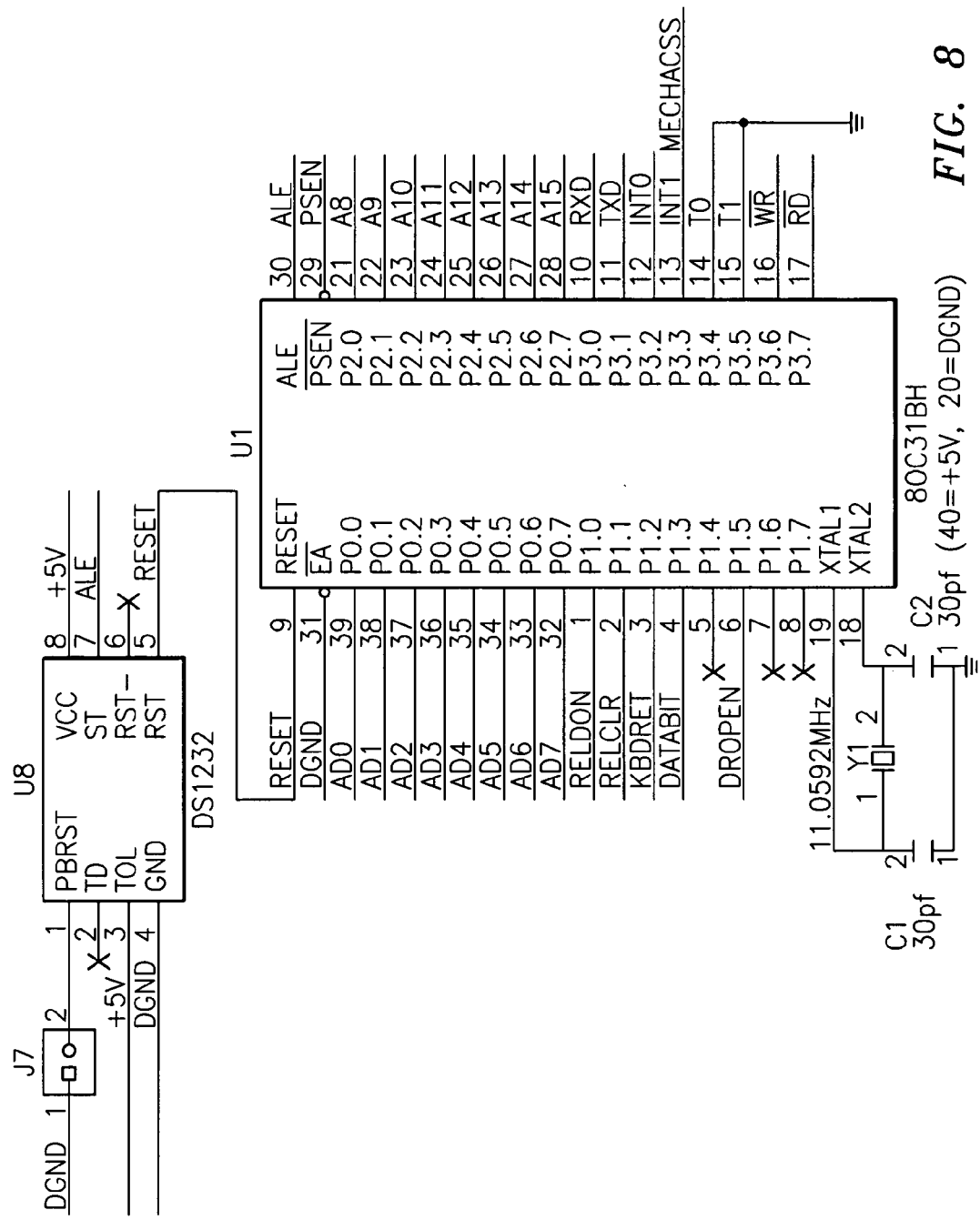
Figure 9:
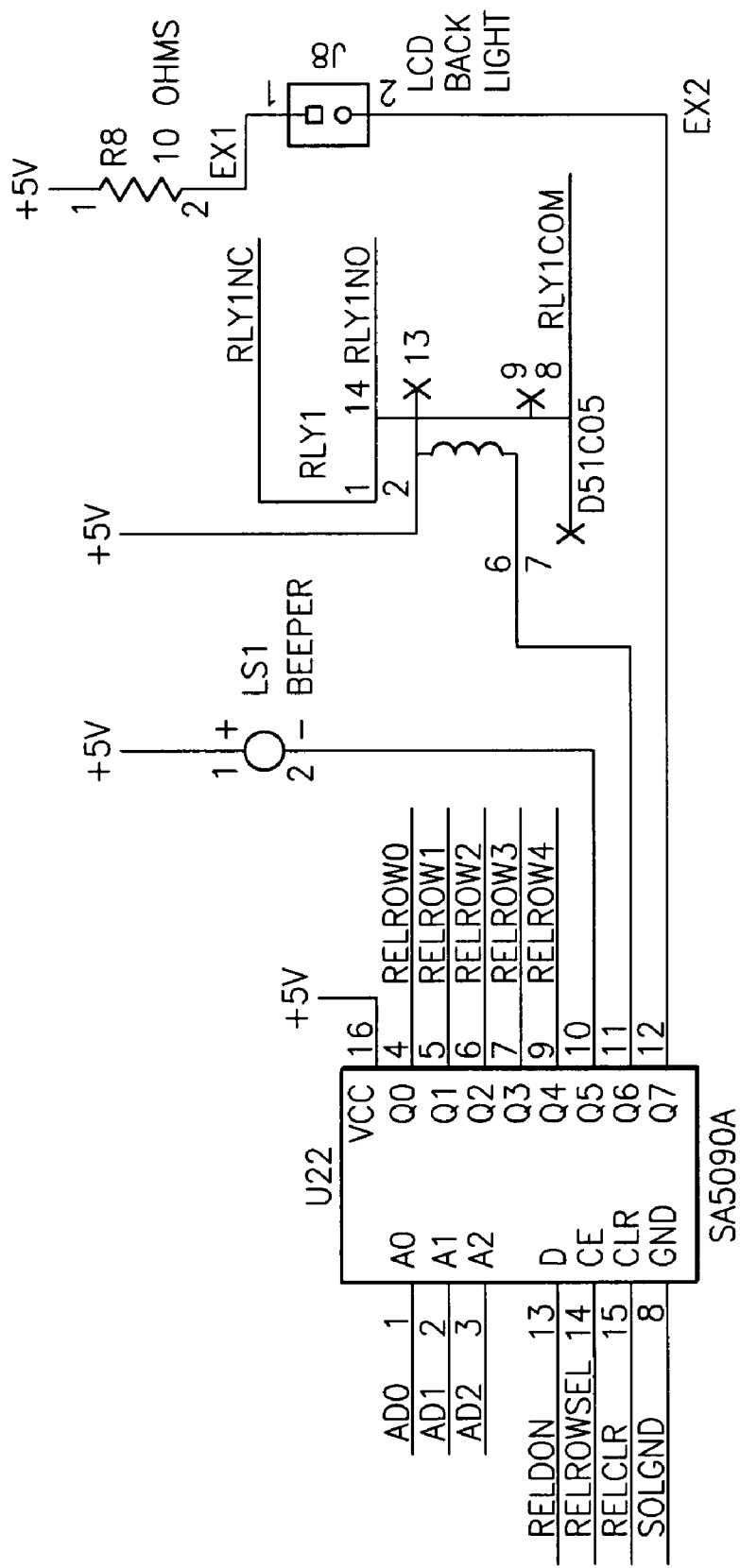
Figure 10:
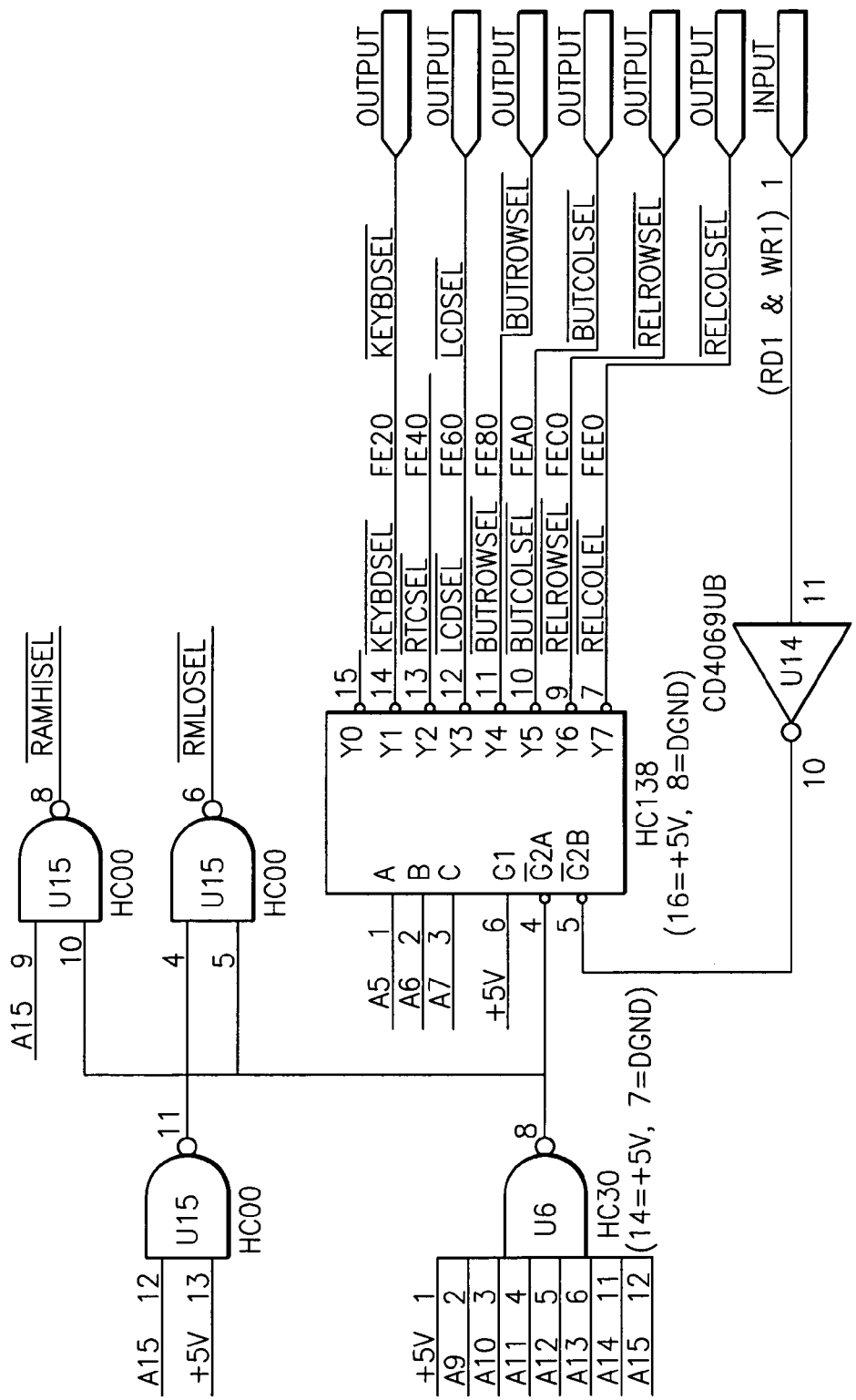

In operation and with reference made specifically to FIGS. 6–10, RELCOL1 is received from driver U20 in FIG. 7 which level shifts signals received from decoder U19. U19 is a 3-8 decoder with latch that receives and decodes address signals AD0, AD1 and AD2 from microprocessor U1 of FIG. 8 and holds its last outputs while RELCOLSEL remains high.

RELROW1 is received from addressable driver U22 (FIG. 9) whose output at a specific line (i.e. RELROW1, RELRO2, RELROW3 or RELROW4) is selected by address lines AD0, AD1 and AD2 and whose output value is either a high or low level as presented by RELDON when RELROWSEL is a low level. RELROWSEL is developed in the HC138 3-8 line decoder of FIG. 10 by decoding address lines A5–A7 and A9–A15 received from microprocessor U1. Outputs from microprocessor U1 to illuminate any of the illuminated lightsources 60 as just discussed are generated when it is desired to indicate the position of a smartkey for removal.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense. For example, each smartkey housing may include more than one lightsource associated therewith, and further the particular location of each lightsource relative to the smartkey housing may differ, as long as light is channeled to the front surface 39 of the housing. For example, the lightsources may merely be towards the back of the smartkey housing and towards the bottom edge thereof, or may even be on a side thereof (or above or below), wherein reflectors or the like could be formed within the housings to redirect the light towards and out the front surface 39 of the housings.

More specific and additional features, not material to the operation of the present invention, can be understood from a reading of Assignee's Patents, wherein it is clearly disclosed in detail the manner in which an authorized user can obtain the release of one or more selected smartkeys from their positions in the smartkey housings, and this invention is applicable to both smartkeys that are releaseably lockable or not, in smartkey housings 30. However, as detailed herein, it is now not necessary to use wire harnesses to electrically connect either the LEDs or the connectors to which the two terminal memory device is electrically coupled, as all of this functionality is achieved by the use of conductive pads as disclosed herein. Moreover, the present invention provides improved visibility of the location of the smartkey housing in which is located the smartkey that has been authorized to be removed.

What is claimed is:

1. A storage system for storing at least one object, wherein the object is associated with a smartkey, the system comprising:
   a system housing;
   a front panel with at least one opening therein;
   a support board coupled to the system housing and behind the front panel;
   at least one smartkey housing, coupled to the front panel and operable to receive the smartkey therein, wherein the smartkey housing is coupled to the front panel by a snap-fitting arrangement;
   a concentrated lightsource which is associated with the smartkey housing and coupled to the support board, the concentrated lightsource being positioned behind at least a portion of the smartkey housing;
   circuitry for processing information and causing the illumination of the concentrated lightsource;
   wherein at least a portion of the smartkey housing is illuminatable when the concentrated lightsource associated with the smartkey housing is illuminated.

2. The storage system as claimed in claim 1, wherein a front surface of the smartkey housing extends outwardly from the front panel, and wherein at least the front surface of the smartkey housing is illuminated when the concentrated lightsource associated with and disposed behind the smartkey housing is illuminated.

3. The storage system as claimed in claim 2, wherein at least a portion of the smartkey housing is comprised of a translucent material.

4. The storage system as claimed in claim 1, wherein the smartkey housing comprises a lightguide integrally formed with and extending outwardly from the back of the smartkey housing, the lightguide having a distal end in which a concavity is formed.

5. The storage system as claimed in claim 4, wherein the concentrated lightsource is at least essentially aligned with the concavity of the lightguide to channel light from the concentrated lightsource into the lightguide and through the smartkey housing.

6. The storage system as claimed in claim 1, wherein the concentrated lightsource is an LED.

7. The storage system as claimed in claim 1, wherein the smartkey housing includes a guidepost, and wherein the support board receives the guidepost of the smartkey housing;
   whereby the smartkey housing is prohibited from being incorrectly mounted against the support board due to the fact that the smartkey housing cannot be snap-fitted to the front panel if the guidepost is not received by the support board.

8. The storage system as claimed in claim 1, wherein the storage housing includes a recess and the support board is positioned in the recess.

9. A storage system for storing a plurality of objects, wherein one or more objects are each associated with a smartkey, the system comprising:

a system housing;

a front panel with at least one opening therein;

a support board coupled to the system housing and behind the front panel;

a plurality of smartkey housings, each of which are coupled to at least one of the front panel and the support board, and operable to receive a smartkey therein;

at least one concentrated lightsource associated with each respective smartkey housing and coupled to the support board, the concentrated lightsources being positioned behind at least a portion of each of the respective smartkey housings;

circuitry for processing information and causing the illumination of specific concentrated lightsources;

wherein at least a portion of each smartkey housing is illuminatable when the concentrated lightsource associated with a smartkey housing is illuminated.

10. The storage system as claimed in claim 9, wherein the storage housing includes a recess and the support board is positioned in the recess.

11. A storage system for storing at least one object, wherein the object is associated with a smartkey the smartkey comprising a two terminal electronic memory device that comprises an individualized code, the system comprising:

a system housing;

a front panel with at least one opening therein;

a support board coupled to the system housing and behind the front panel;

at least one smartkey housing, coupled to at least one of the front panel and the support board, and operable to receive the smartkey therein;

a concentrated lightsource which is associated with the smartkey housing and coupled to the support board;

circuitry for serially receiving the individualized code from the two terminal electronic memory device, processing information provided by a user and based thereon, causing the illumination of the concentrated lightsource;

wherein the concentrated lightsource is positioned proximate the smartkey housing so that at least a portion of the smartkey housing is illuminatable when the concentrated lightsource associated with the smartkey housing is illuminated.

12. The storage system as claimed in claim 11, wherein a front surface of the smartkey housing extends outwardly from the front panel, and wherein at least the front surface of the smartkey housing is illuminated when the concentrated lightsource associated with the smartkey housing is illuminated.

13. The storage system as claimed in claim 12, wherein at least a portion of the smartkey housing is comprised of a translucent material.

14. The storage system as claimed in claim 11, wherein the smartkey housing comprises a lightguide integrally formed with and extending outwardly from the back of the smartkey housing, the lightguide having a distal end in which a concavity is formed.

15. The storage system as claimed in claim 14, wherein the concentrated lightsource is at least essentially aligned with the concavity of the lightguide to channel light from the concentrated lightsource into the lightguide and through the smartkey housing.

16. The storage system as claimed in claim 11, wherein the storage housing includes a recess and the support board is positioned in the recess.

17. A storage system for storing at least one object, wherein the object is associated with a smartkey, the system comprising;

a system housing defining a recess;

a front panel with at least one opening therein;

a support board positioned in the recess and behind the front panel;

at least one smartkey housing, coupled to at least one of the front panel and the support board, and operable to receive the smartkey therein;

a concentrated lightsource which is associated with the smartkey housing and mounted to the support board, the concentrated lightsource being positioned such that upon the illumination of the concentrated lightsource, at least a portion of the smartkey housing is illuminatable, wherein light is channeled thought the smartkey housing and out at least a front surface thereof;

and circuitry for processing information and causing the illumination of the concentrated lightsource.

* * * * *